US007307981B2

(12) United States Patent
Choi et al.

(10) Patent No.: US 7,307,981 B2
(45) Date of Patent: Dec. 11, 2007

(54) APPARATUS AND METHOD FOR CONVERTING LSP PARAMETER FOR VOICE PACKET CONVERSION

(75) Inventors: Yong Soo Choi, Gwangmyeong-si (KR); Dae Hee Youn, Seoul (KR); Kyung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1073 days.

(21) Appl. No.: 10/246,539

(22) Filed: Sep. 19, 2002

(65) Prior Publication Data

US 2003/0055629 A1 Mar. 20, 2003

(30) Foreign Application Priority Data

Sep. 19, 2001 (KR) ................................ 2001-58029

(51) Int. Cl.
*H04L 12/66* (2006.01)

(52) U.S. Cl. ...................... 370/352; 370/401; 370/466; 704/265

(58) Field of Classification Search ..................... None
See application file for complete search history.

(56) References Cited

U.S. PATENT DOCUMENTS 5,991,716 A * 11/1999 Lehtimaki ................... 704/212
5,995,923 A * 11/1999 Mermelstein et al. ....... 704/219
6,678,654 B2 * 1/2004 Zinser et al. ............... 704/221
6,829,579 B2 * 12/2004 Jabri et al. ................... 704/221
7,016,831 B2 * 3/2006 Suzuki et al. ............... 704/203
7,142,559 B2 * 11/2006 Choi et al. .................. 370/466

OTHER PUBLICATIONS

Park et al, An Efficient Transcoding Algorithm for G.723.1 And EVRC Speech Coders, IEEE, pp. 1561-1564, 2001.*
Lovrich et al, A Multi-Rate Transcoder, IEEE, pp. 715-722, 1989.*
Tsai et al, GSM To G.729 Speech Transcoder, pp. 485-488, 2001.*

* cited by examiner

*Primary Examiner*—Frank Duong
(74) *Attorney, Agent, or Firm*—Ked & Associates, LLP

(57) ABSTRACT

An apparatus for converting voice packets transmitted/received through a network includes a first transcoder for performing at least one of bit-unpacking and unquantization on an encoded packet at a first encoder, namely transmitting party, to obtain an LSP (Line Spectrum Pair) parameter of the first encoder, and converting and unquantizing the LSP parameter to an LSP parameter of a second encoder, namely receiving party, to do bit-packing. A second transcoder performs at least one of bit-unpacking and unquantization on an encoded packet at the second encoder, namely transmitting party, to obtain an LSP parameter of the second encoder, and converts and unquantizes the LSP parameter to an LSP parameter of the first encoder, namely receiving party, to do bit-packing.

26 Claims, 10 Drawing Sheets

APPARATUS AND METHOD FOR CONVERTING LSP PARAMETER FOR VOICE PACKET CONVERSION

BACKGROUND OF THE INVENTION

1. Field of the Invention

The present invention generally relates to an apparatus for converting voice packets between communication systems. More particularly, the present invention relates to an apparatus and a method for converting LSP (Line Spectrum Pair) parameter for voice packet conversion, which is capable of outputting wanted voice packet through a mutual conversion of voice packets with different formats and their relevant LSP parameters between communication systems using different voice encoders (i.e., vocoders).

2. Background of the Related Art

The evolution of the information and communications industry has let to extensive research on voice processing, as this technology is expected to be an integral part of future communications systems. Research on voice processing can be divided into three types: voice encoding, voice recognition, and voice conversion. Among these, voice encoding technology is most widely used in current multimedia applications.

More specifically, thanks to the development of multimedia and mobile communications, services that used to be available to particular organizations or individuals are now accessible to the public, and the number of services is expected to continue increasing. Unfortunately current transmission rates cannot satisfy the increasing number of users. There was an attempt to increase the number of users by decreasing the transmission rate and allowing more users on an equal channel, but this unavoidably deteriorated speech quality. In lieu of changing the transmission rate, voice encoders also known as vocoders (coder/decoder), has been proposed.

Voice communication services over mobile telecommunications and data networks use different kinds of vocoders depending on the application. More specifically, S-96 QCELP, EVRC, GSM-EFR, or GSM-AMRA are being used in the mobile telecommunication systems, G.723 or G.729 are being used over data networks, and G.711 is being used in PSTN (Public Switched Telephone Network). Because of these different standards, an apparatus for converting voice packets which adhere to different formats is absolutely necessary for allowing communications to take place between networks that use different kinds of vocoders. Such task is accomplished by a media gateway.

FIG. 1 is a schematic diagram of a known wire/wireless communication network. In the drawing, a media gateway (hereinafter, a "packet converter") 107 converts voice packets that were transferred from different vocoders (EVRC/AMR, G.711, G.723.1/G.729) 101, 102 and 103 through different networks (Mobile Network, PSTN, IP Network) 104, 105, and 106 to voice packets of an object encoder.

In general, standard vocoders currently in use in the wire/wireless communication network are based on the CELP (Code Excited Linear Prediction) type encoding scheme as shown in FIG. 2, although there are minor differences in their specific implementations. The CELP encoder usually extracts a particular parameter of a voice signal.

FIG. 3 is a schematic diagram of a packet converting system of a known voice encoder. As shown, the system includes a first vocoder 110, networks 120 and 140, a second vocoder 150, and a packet converter 130. The first vocoder includes a first encoder (Encoder A) 111 for encoding a voice signal to a voice packet A and a first decoder (Decoder A) 112 for decoding the voice packet A to a voice signal. Networks 120 and 140 transfer the packet to different encoders. The second vocoder 150 includes a second encoder (Encoder B) 151 for encoding a voice signal to a voice packet B and a second decoder (Decoder B) 152 for decoding the voice packet B to a voice signal. And, a packet converter 130 converts the packets that go back and forth between the first vocoder 110 and the second vocoder 150.

The packet converter includes a third decoder (Decoder A) 131 for decoding the voice packet A using the same coding scheme and a third encoder (Encoder B) 132 for encoding the decoded voice signal by the third decoder 131 by using a destination coding scheme and then outputting a packet B. The converter also includes a fourth decoder (Decoder B) 133 for decoding the voice packet B by using the same coding scheme and a fourth encoder (Encoder A) 134 for encoding the decoded voice signal by the fourth decoder 133 by using the designation coding scheme and then outputting a packet A.

Further description on the packet converting apparatus between communication systems now follows with reference to FIG. 3. An input voice signal (PCM) is converted to a voice packet A (Packet A) by the first encoder (Encoder A) 111, and the voice packet A is sent to the packet converter 130 via the connected network 120. The packet converter 130 decodes the voice packet A by the third decoder 131 and then generates a voice signal (PCM) to convert the voice packet A to a destination packet. The decoded voice signal is then encoded by the third encoder 132 and the encoded voice signal is converted to a voice packet B of an object encoder. Finally, the voice packet B is output to the network.

Further, the voice packet B (Packet B) having been converted by the packet converter 130 is transferred to the second decoder 151, the destination, through the connected network 140. The second decoder 151 then decodes the voice packet B, and outputs it as a PCM voice signal.

A voice signal (PCM) inputted in the second vocoder 150 is converted to a voice packet B (Packet B) by the second 152, and the voice packet B is sent to the packet converter 130 via the connected network 140. The packet converter 130 decodes the voice packet B by the fourth decoder 133 and then generates a voice signal (PCM) to convert the voice packet B to a destination packet. The decoded voice signal is then encoded by the fourth encoder 134 and the encoded voice signal is converted to a voice packet A of an object encoder. Finally, the voice packet A is output to the network.

Voice packet A (Packet A) having been converted by the packet converter 130 is transferred to the second decoder 112, the destination, through the connected network 120. The second decoder 121 then decodes the voice packet A and outputs it as a PCM voice signal.

The above-described packet-converting scheme is based on the Tandem encoding scheme, in which an encoded PCM signal goes through a complicated analytical process for packet conversion. Encoding parameters are then obtained therefrom. These parameters are quantized, packeted, and transmitted to a receiving end over the network. In short, the packet is converted by converting parameters indirectly with a PCM signal.

CELP encoders are broadly used in voice communication over data networks such as VoIP (Voice over IP), and particularly G.723.1 is used for transcoding (packet conversion). FIGS. 4 and 5 are flow charts showing how packet conversion is performed in a packet converting apparatus between a first encoder and a second encoder, 0.723.1.

FIG. 4 involves conversion of an encoded packet by another encoder X (110 in FIG. 3), namely the first encoder, to a packet of 0.723.1, namely the second encoder. When an encoded packet X is input, the decoder X performs bit unpacking (S211) on data, and by quantizing the bit unpacked data obtains an LSP (Line Spectrum Pair) parameter (LSPx) (S212). A PCM formatted voice signal is then synthesized using the LSP voice parameter as well as other parameters (S213). Here, LSP are equivalent parameters to be converted for transferring LPC (Linear Predictive Coefficient). That is, each frequency domain is observed.

Encoder G.723.1 220 receives the PCM voice signal, and using an ACR (Auto Correlation Method) obtains linear predictive coefficient ($LPC_{G.723.1}(i)$, $0 \leqq i \leqq 9$) (S221) from the PCM voice signal. Then, the encoder G.723.1 220 converts the $LPC_{G\ 7231}(i)$ to LSP parameters based on the polynomial evaluation and a cosine table having 512 values for compensating LSP scale difference found between the second encoder, G.723.1, and another voice coder (S222). The encoder G.723.1 quantizes LSP parameter to LSP parameter ($LPC_{G.723.1}(i)$, $0 \leqq i \leqq 9$) of the encoder G.723.1 (S223), performs bit packing on other quantized data other than the LSP, and outputs the data as a voice packet of the encoder G.723.1 (S224).

The ACR method indicates measurement of similarity (correlation) between an input signal and the signal that delayed the input signal.

The procedure of converting LPC, a vocal tract transfer function, to LSP includes the following steps:

1. Obtain roots of a polynomial composed of LPC
2. Uses cosine table since the roots of the polynomial are expressed by trigonometric function values.

The CELP vocoder for voice packet conversion extracts a particular parameter in a voice signal, and encodes parameters such as LSP parameters, Pitch, ACB (Adaptive CodeBook), ACB index, FCB (Fixed CodeBook) gain, and FCB index values.

LSP parameters indicate a spectrum envelope of a voice signal, and Pitch and ACB index represent basic frequencies. The ACB gain indicates energy of a pitch element, and FCB gain and index represent the other remainder elements. Although there might be slight differences depending on expression unit or range, quantization method, and transmission rate, such encoding parameters have the same meaning with one another. The voice parameters are used during the course of returning to a wanted packet again after getting them from a packet or PCM signal.

FIG. 5 depicts packet conversion from the G.723.1 encoder (150 in FIG. 3) to another encoder. G.723.1 decoder 230 does the bit unpacking of an encoded packet at the G.723.1 encoder by using the same encoder (i.e., G.723.1) (S231), and obtains the LSP voice parameter of the G.723.1 encoder by unquantizing the unpacked data (S232). And, the PCM formatted voice signal is synthesized by using a voice parameter (S233).

Another encoder X 240 receives the PCM. voice signal from an input of another encoder X, obtains linear predictive coefficient ($LPC_x(i)$, $0 \leqq i \leqq 9$) out of the PCM input signal by using the ACR (Auto Correlation Method) (S241), converts the LPC parameter to an LSP parameter ($LSP_x$ (i)) based on the cosine table having polynomial evaluation and 512 (2π) quantization tables (S242), and quantizes the LSP parameter to make the LSP parameter to another encoded packet (S243). Finally, the LSP parameter is output by doing the bit-packing together with other parameters (S244).

In other words, when transcoding conversion between G.723.1 and another encoder is involved, a PCM signal is obtained from the G.723.1's packet by doing bit-unpacking and quantization processes (namely, encoding), and an LPC parameter for a receiving party is obtained by using the ACR. Here, the LPC is converted to LSP through chebyshev polynomial evaluation and cosine table search. Particularly, the cosine table has set 360 degrees (2π) to 512 to compensate scale differences among different vocoders, and it has a cosine value for every degree, namely values for COS (360/512*n) (n=0~511).

To summarize, transcoding between G.723.1 and another encoder was realized through the encoding process to obtain a PCM signal, the LPC analytical process based on the ACR, and then LSP converting process through the chebyshev polynomial evaluation and cosine table search. These steps resulted in converting the PCM signal to an encoded packet a receiving party can encode before outputting the signal.

The conventional method has at least one drawback: too many calculations. These calculations include bit-unpacking to obtain a voice parameter, synthesizing a PCM formatted voice signal by using the voice parameter to obtain a PCM signal, and analyzing the PCM signal again to calculate the LSP. Moreover, too many calculations have to be performed in the encoding process to obtain a PCM signal, the LPC analytical process based on the ACR, and the LSP converting process performed through the chebyshev polynomial evaluation and cosine table search.

Considering that 90% of the calculations are for encoding and the remaining 10% is for decoding, much calculation should such encoding and decoding in the course of LSP conversion.

The conventional method has further drawbacks. For example, an additional delay (7.5 ms) could be generated for the LPC analysis, and on the top of searching the cosine table having 512 values during the course of LSP conversion based on polynomial evaluation and cosine table search, a memory is required to store the cosine table.

SUMMARY OF THE INVENTION

An object of the invention is to solve at least the above problems and/or disadvantages and to provide at least the advantages described hereinafter.

It is an object of the present invention to provide an apparatus and a method for converting an (Line Spectrum Pair) parameter for voice packet conversion by extracting LSP information from an encoded packet of transmitting party's encoder, and converting it directly to an LSP parameter of a receiving party's codec without performing chebyshev polynomial evaluation and searching the cosine table.

Another object of the present invention is to provide an apparatus and a method for converting an LSP parameter for voice packet conversion, wherein an LSP parameter of G.723.1 is obtained by interpolating a frame LSP parameter of another encoder and multiplying 512 that has been designated to compensate LSP scale differences in different vocoders, while an LSP parameter of another encoder is obtained by interpolating LSP in an encoded packet by G.723.1 and dividing by 512.

Still another object of the present invention is to provide an apparatus and a method which converts an LSP parameter for voice packet conversion with fewer calculations by eliminating chebyshev polynomial evaluation and searching cosine table, which is accomplished by multiplying the LSP parameter of the previous frame having been encoded at another encoder by an interpolation constant, multiplying LSP parameter of the current frame by a value of subtracting the interpolation constant from the maximum interpolation constant, adding the current frame and the previous frame together, and shifting by a bit corresponding to 512.

To achieve these and other objects of the present invention, there is provided a voice packet apparatus for trans-converting a transmitted/received voice packet through network by using different encoders, the apparatus including: a first transcoder for performing at least one of bit-unpacking and unquantization on an encoded packet at a first encoder, namely transmitting party, to obtain an LSP parameter of the first encoder, and converting and unquantizing the LSP parameter to an LSP parameter of a second encoder, namely receiving party, to do bit-packing; and a second transcoder for performing at least one of bit-unpacking and unquantization on an encoded packet at the second encoder, namely transmitting party, to obtain an LSP parameter of the second encoder, and converting and unquantizing the LSP parameter to an LSP parameter of the first encoder, namely receiving party, to do bit-packing.

Compared to a conventional Tandem method, the present invention has several advantages in view that it can cut down much calculation by eliminating the process for obtaining a PCM signal in the course of calculating LSP, and no memory for storing the cosine table is necessary since the cosine table is not searched out for LSP conversion any more, and the additional delay due to LPC analysis naturally disappeared.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

A preferred embodiment of the present invention will be described herein below with reference to the accompanying drawings. In the following description, well-known functions or constructions are not described in detail since they would obscure the invention in unnecessary detail.

Figure 1:
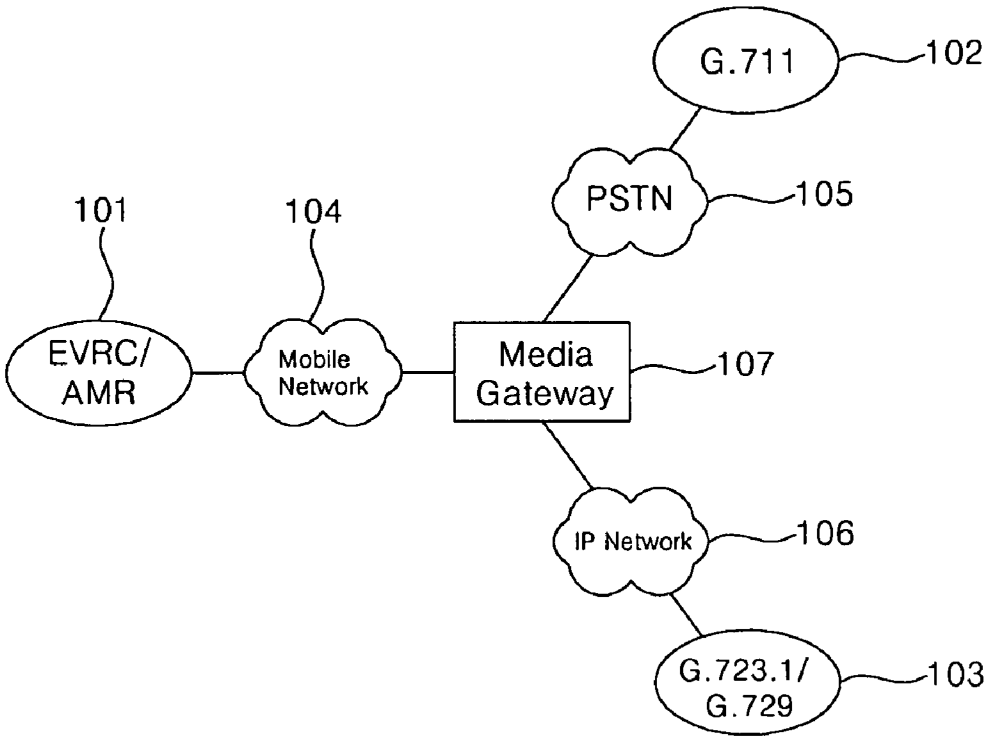
Fig.1 (Related art)
FIG. 1 is a schematic diagram of a known wire/wireless communication network in the related art.
Figure 2:
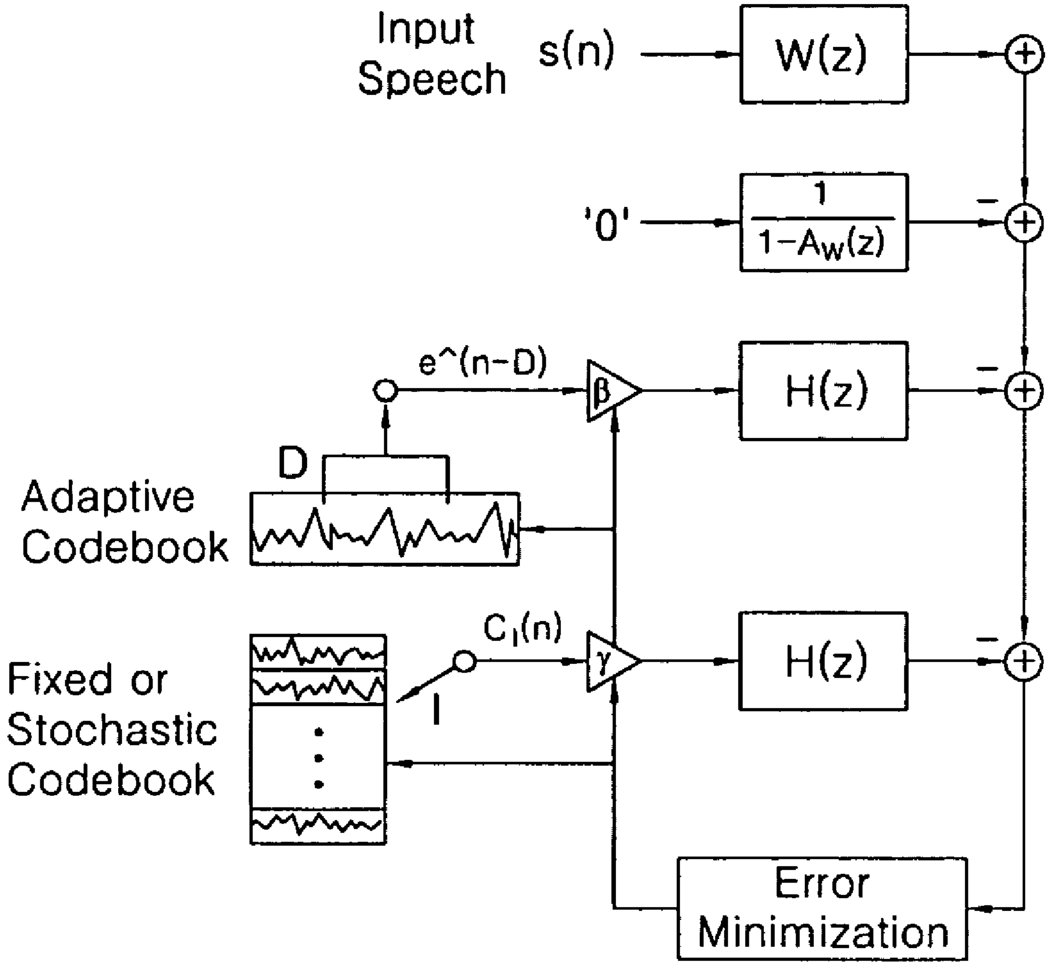
Fig.2 (Related art)
FIG. 2 depicts the structure of a CELP type voice encoder.
Figure 3:
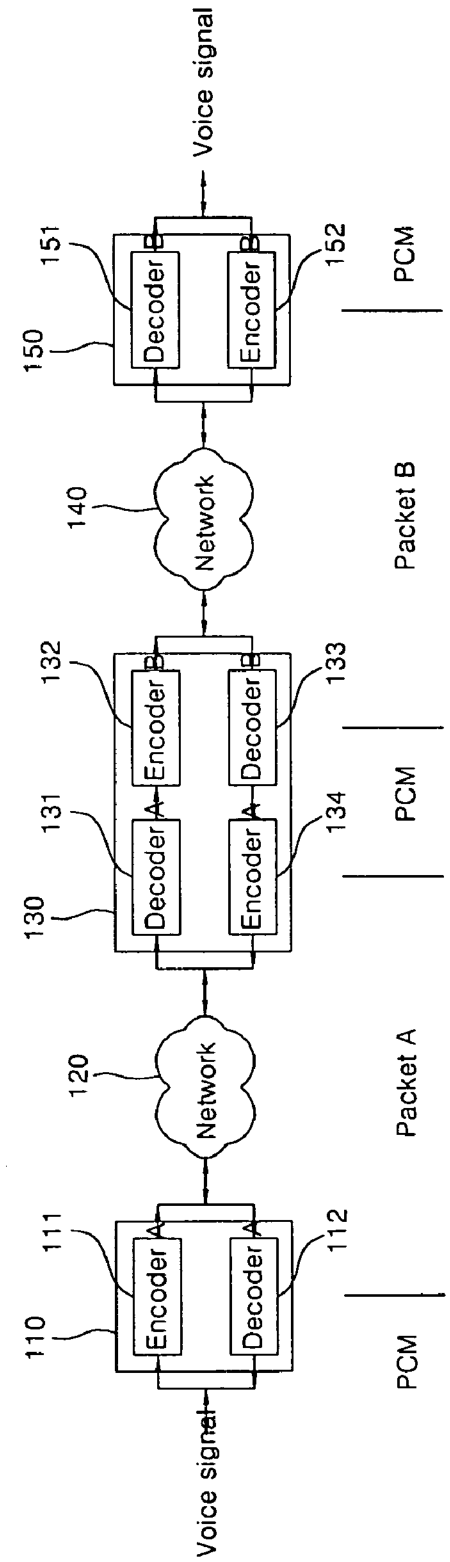
Fig.3 (Related art)
FIG. 3 is a schematic diagram of a voice packet converting apparatus in a general communication system in the art.
Figure 4:
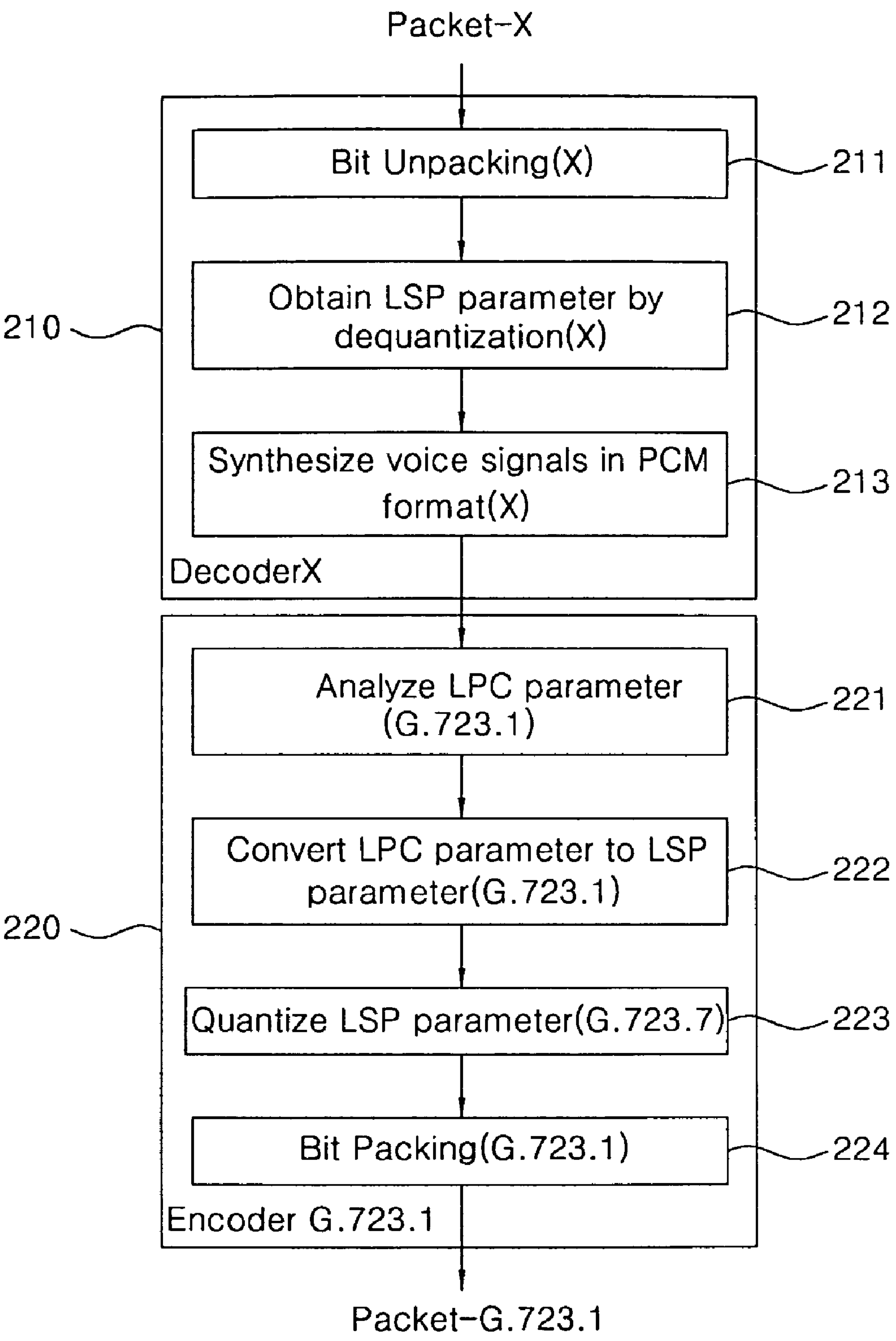
Fig. 4 (Related art)
FIG. 4 is a flow chart illustrating conversion of a voice packet of a first encoder, namely another encoder, to a voice packet of a second encoder, namely G.723.1 encoder, in a voice packet converting apparatus of a communication system in the related art.
Figure 5:
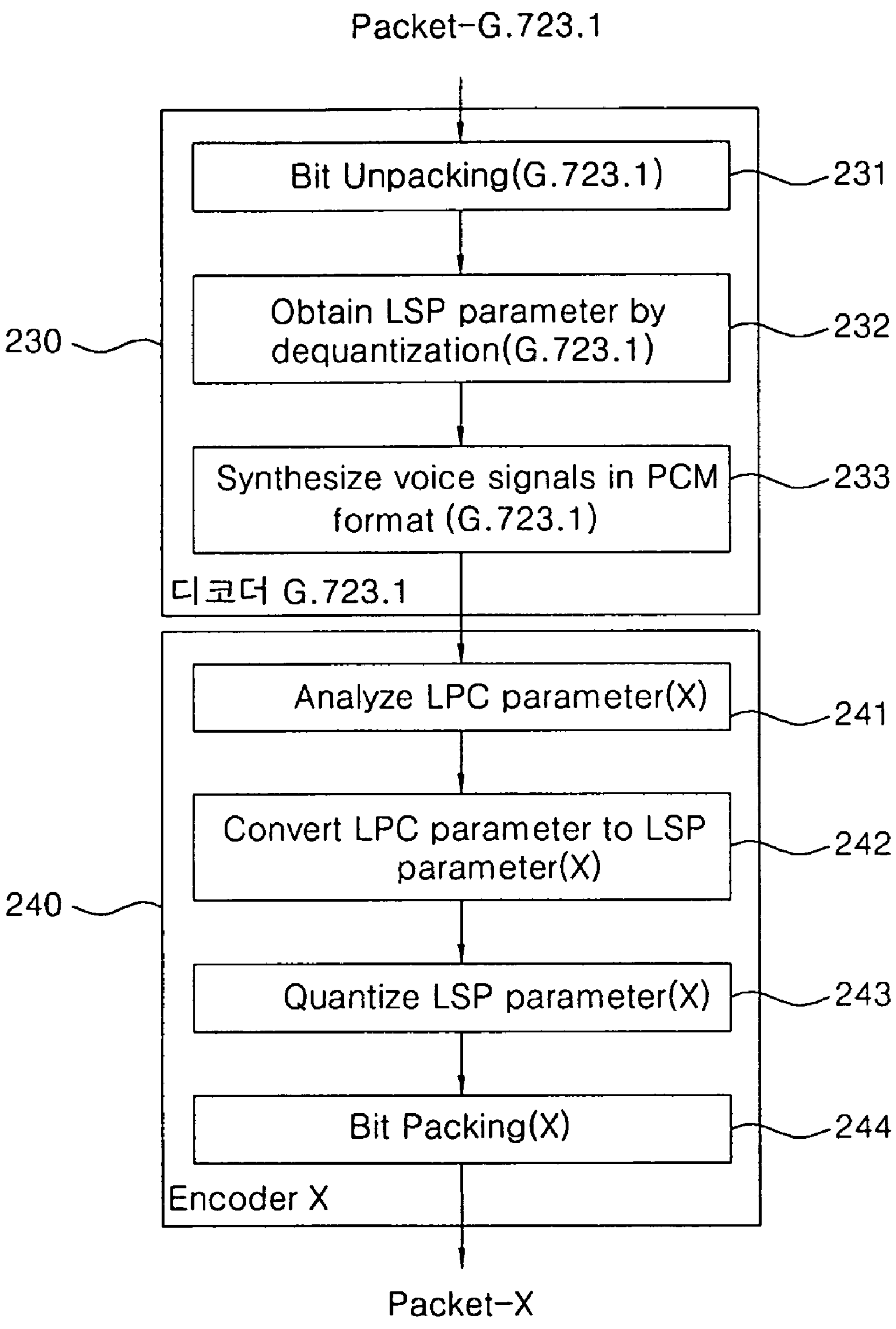
Fig. 5 (Related art)
FIG. 5 is a flow chart illustrating conversion of a voice packet of the voice packet of G.723.1 encoder being centered on LSP parameter conversion to the voice packet of another encoder in a voice packet converting apparatus of a communication system in the related art.
Figure 6:
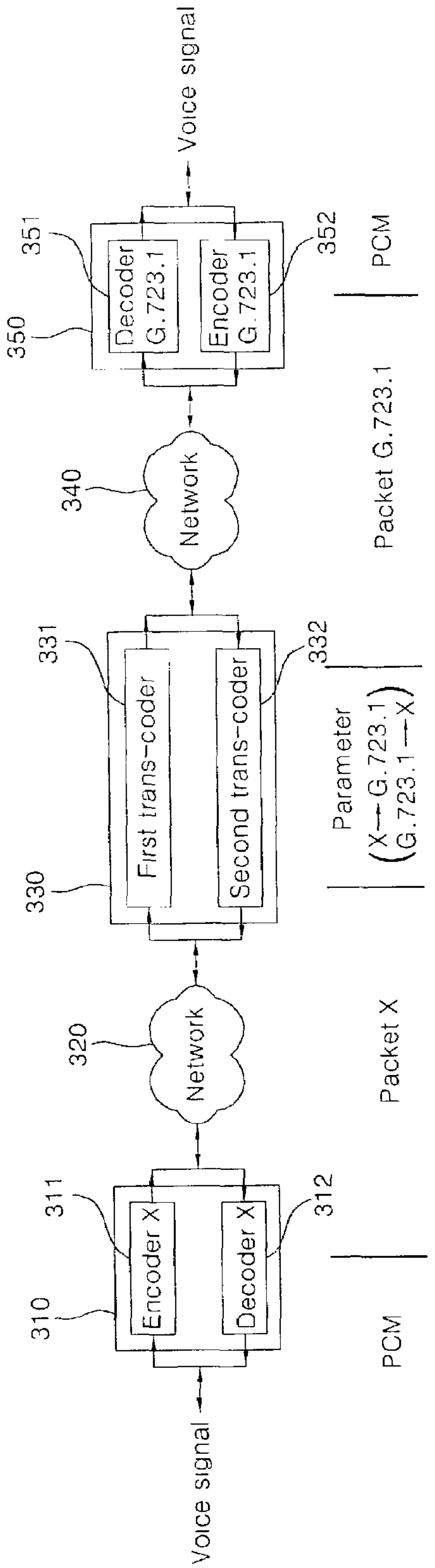
FIG. 6 is a schematic diagram representing an apparatus for converting LSP parameter for voice packet conversion in accordance with a preferred embodiment of the present invention.
Figure 7:
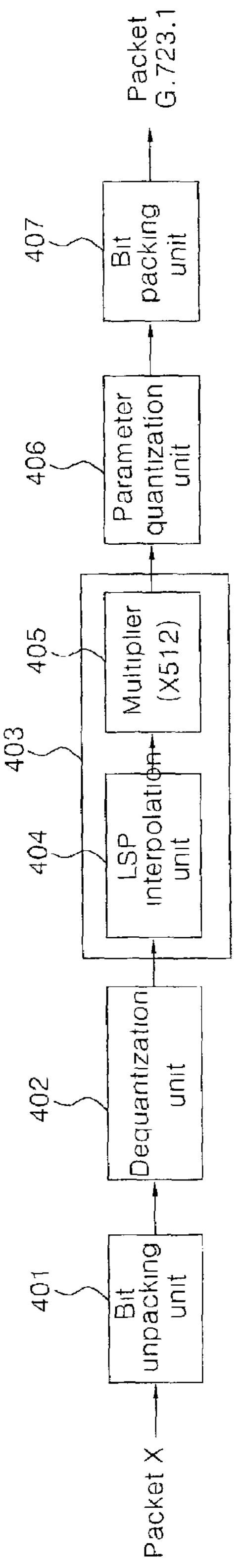
FIG. 7 and FIG. 8 are detailed diagrams depicting an apparatus for converting LSP parameter for voice packet conversion between another encoder and G.723.1 encoder in accordance with the preferred embodiment of the present invention.
Figure 8:
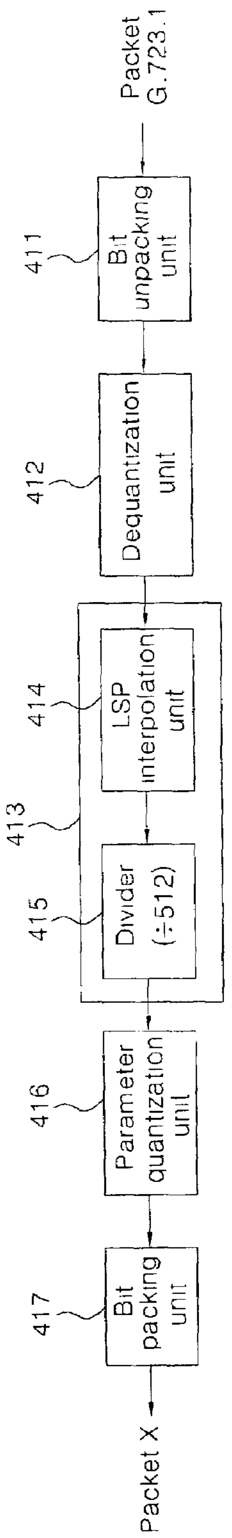
Figure 9:
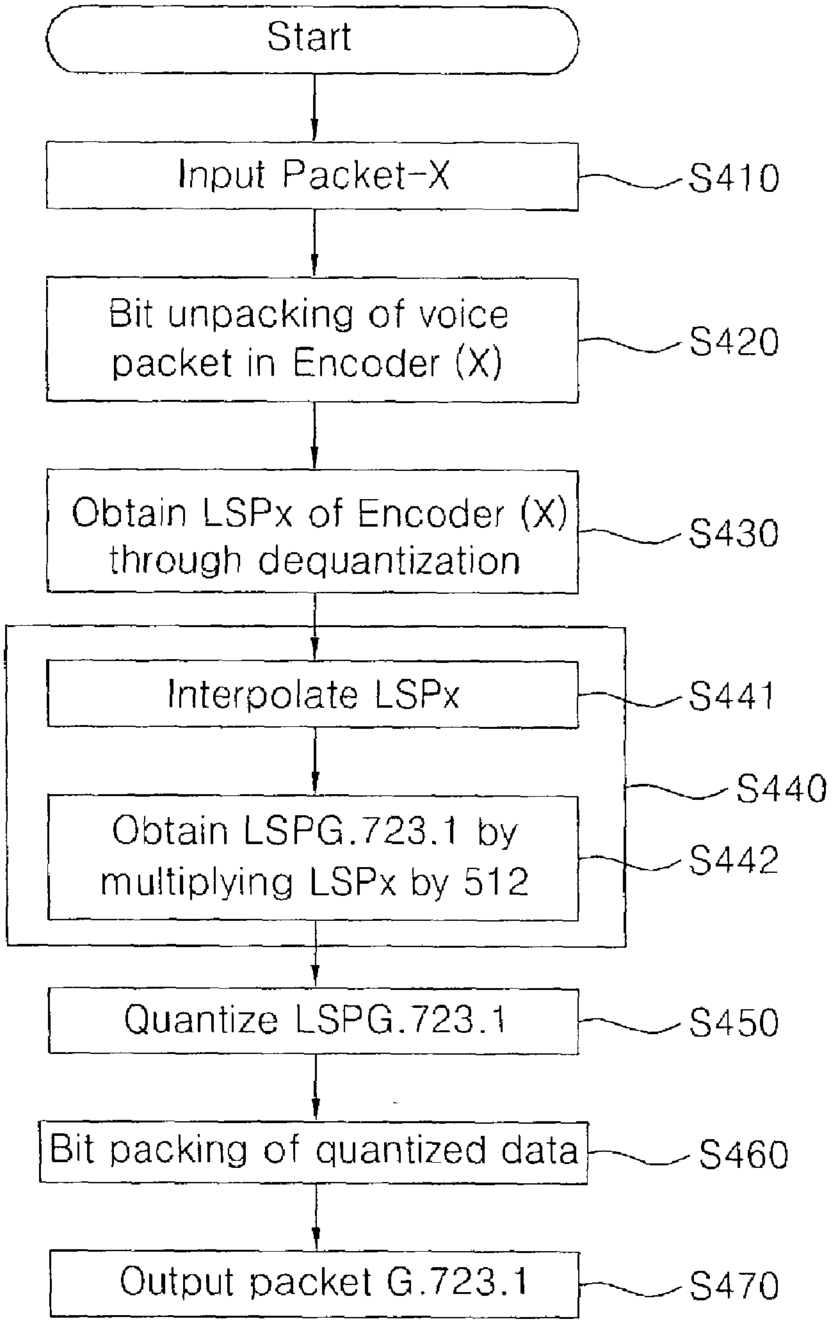
FIG. 9 and FIG. 10 are flow charts representing a method for converting LSP parameter for voice packet conversion between another encoder and G.723.1 encoder in accordance with the preferred embodiment of the present invention.
Figure 10:
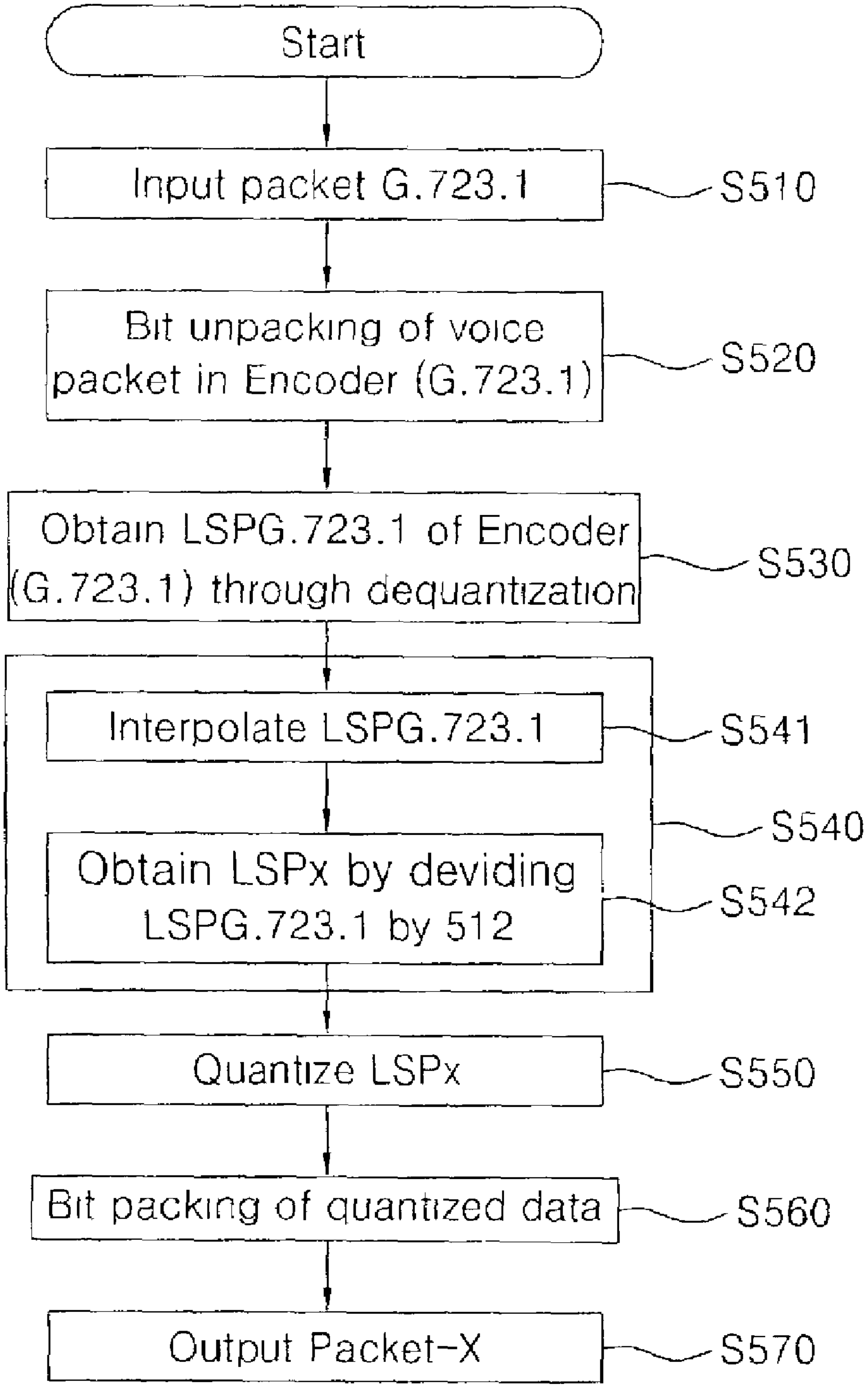

FIG. 6 is a schematic diagram representing an apparatus for converting an LSP parameter for voice packet conversion in accordance with an embodiment of the present invention. FIGS. 7 and 8 are detailed diagrams depicting an apparatus for converting an LSP parameter for voice packet conversion between another encoder and G.723.1 encoder in accordance with this embodiment. FIGS. 9 and 10 are flow charts showing steps included in a method for converting an LSP parameter for voice packet conversion between another encoder and G.723.1 encoder in accordance with this embodiment.

Referring to FIG. 6, the apparatus for converting an LSP parameter includes a first encoder, (namely another encoder) 310, a second endocer 350, networks 320 and 340, and a packet converter 350. The first encoder 310 includes a first encoder 311 and a first decoder 312 for encoding and decoding. The second encoder (namely G.723.1 encoder 350) includes a second decoder 351 and a second encoder 352 for encoding and decoding of G.723.1 encoding for voice encoding during the communication over data network. Networks 320, 340 for packet transfer are respectively connected to encoders 310, 350. And, packet converter 330 includes a first trans-coder 331 and a second trans-coder 332. The first trans-coder obtains an LSP parameter of a voice packet of another encoder 310, converts the LSP parameter to that of G.723.1 encoder, and outputs the LSP parameter as G.723.1 packet. The second transcoder 332 obtains an LSP parameter of a relevant G.723.1 using the voice packet of G.723.1 encoder 350, converts the LSP parameter to an LSP parameter of another encoder 310, and outputs the LSP parameter as a packet of G.723.1 encoder 310.

FIG. 7 is a schematic diagram of the first trans-coder that converts the LSP parameter of another parameter to the LSP parameter of the G.723.1 encoder. As depicted, the first trans-coder includes a bit-unpacking unit 401 for bit-unpacking a voice packet of another encoder X, a unquantizing unit 402 for unquantizing bit-unpacked data to obtain $10^{th}$ coefficient LSP parameter, an LSP parameter converting unit 403 including an LSP interpolation unit 404 for frame-interpolating LSP parameter of another encoder and a multiplier 405 for multiplying the interpolated LSP parameter by the interpolation constant, 512, to obtain LSP parameter of G.723.1, a parameter quantizing unit 406 for performing quantization using the G.723.1 parameter, and a bit-packing unit 407 for bit-packing the quantized data to G.723.1 voice packet.

FIG. 8 depicts the structure of the second trans-coder 332, which converts the LSP parameter of G.723.1 encoder to the LSP parameter of another encoder. As shown, the second trans-coder 332 includes a bit-unpacking unit 411 for bit-unpacking a voice packet of G.723.1 encoder, a unquantizing unit 412 for unquantizing bit-unpacked data to obtain a $10^{th}$ coefficient LSP parameter, an LSP parameter converting unit 413 including an LSP interpolation unit 414 for frame-interpolating LSP parameter of another encoder and a divider 415 for dividing the interpolated LSP parameter by the interpolation constant, 512 to obtain LSP parameter of another encoder. Also included is a parameter quantizing unit 416 for performing quantization using the parameter of another encoder and a bit-packing unit 417 for bit-packing the quantized data to another encoder's voice packet.

The apparatus for converting LSP parameters for voice packet conversion and a method thereof are now explained with reference to drawings. Referring to FIG. 6, a voice signal having been input into another encoder X 310 is encoded to a voice packet in the first encoder 311, and this is input into the packet converting unit 330 through a connected network 320.

The first trans-coder 331 in the packet converting unit 330 unpacks and unquantizes a relevant LSP parameter using a voice packet of another encoder 312 in order to convert the voice packet of another encoder 310 to a packet for G.723.1, and the LSP parameter is converted to that of G.723.1 by interpolation. The G.723.1 packet is then output using the parameter.

The G.723.1 packet output from the packet converting unit 330 is output after being decoded to a voice signal by the second decoder 350 of the G.723.1 decoder 350.

On the other hand, a voice signal (PCM) having been input in the G.723.1 encoder 350 is encoded by the second encoder 352 and output as a G.723.1 packet. The G.723.1 packet is then input into the packet converting unit 330 through the connected network 240.

The second trans-coder 332 of the packet converting unit 330 unpacks or unquantizes an LSP parameter from the voice packet of G.723.1, in order to convert the G.723.1 packet to a voice packet of another encoder, and converts the LSP parameter of G.723.1 encoder to that of another encoder. Then, after performing quantization and bit-packing on the LSP parameter, the second trans-coder 332 outputs the LSP parameter as a voice packet of another encoder.

The voice packet of another encoder is decoded through the network 320 by the first decoder 312 of another encoder and output as a PCM voice signal.

A detailed structure of the LSP converting apparatus for packet conversion is provided in FIGS. 7 and 8. More specifically, FIG. 7 is a detailed schematic diagram of the first trans-coder and FIG. 8 is a detailed schematic diagram of the second trans-coder.

Referring to FIG. 7, the first trans-coder includes a bit-unpacking unit 401, an unquantizing unit 402, an LSP parameter converting unit 403, a parameter quantizing unit 406, and a bit-packing unit 407.

Bit-unpacking unit 401 does the bit unpacking as soon as a voice packet (Packet X) having been encoded by another encoder X is inputted.

Unquantizing unit 402 is necessary to obtain another encoder's parameters (LSP, Pitch, ACB gain and index, FCB gain and index, and so forth). [Here, the bit-unpacked data are bit-released to $10^{th}$ order LSP coefficients per frame, and an LSP parameters ($LSPx0^{(0)}$ (i), ($0 \leqq i \leqq 9$)) for a current frame of an encoded packet are obtained. In other words, the LSP parameters are unquantized $10^{th}$ order parameters per frame and have values of 0~0.5(π).]

LSP parameter converting unit 403 converts the LSP parameters of another encoder to those of G.723.1. at a high speed. The internal LSP interpolating unit 404 interpolates the LSP parameter ($LSP_x^{(-1)}$ (i)) of a previous frame and the LSP parameter ($LSP_x^{(0)}$(i)) of a current frame.

The LSP parameter of the previous frame is multiplied by an interpolation constant (α), and the LSP parameter of the current frame is multiplied by the value of subtracting the interpolation constant (α) from the maximum interpolation constant, i.e., (1−α). At this time, the interpolation constant (α) is in range of from 0 to 1, and the constant value is gradually decreased as the subframe within a frame is increased. This is primarily because G.723.1 and another encoder have different frame structures from each other, so they should be interpolated by being smoothed with the interpolation constant.

Multiplier 405 multiplies the interpolated LSP by 512. Multiplying the frame by 512 can be implemented by a left shift operation on 9-bit ($2^9$), and the shifting operation is actually a 1 cycle operation in a digital signal process. In other words, now that G.723.1 is expressed by an index in 512 table having a value between 0 and 1, LSP conversion can be performed by taking advantage of such expression characteristic. For example, when G.729 LSP is multiplied by 512, it is converted to G.723.1 LSP parameter ($LSP_{G.723.1}$).

The relation between the LSP parameter of another encoder and the LSP parameter of G.723.1 can be expressed as Equation 1 below:

$$LSP_{G\,723\,1}^{(0)}(i)=(\alpha\times LSP_X^{(-1)}(i)+(1-\alpha)\times LSP_X^{(0)}(i))\times 512 \qquad (1)$$

Here, $LSP_x^{(0)}$ (i) is an un-packed frame of an encoded packet by the first encoder X, wherein (i) is in range of from 0 to 9; (−1) is the previous frame; (0) is the current frame; and α is an interpolation constant. Preferably, the interpolation constant should satisfy the condition, $0 \leqq \alpha . \leqq i$, and it gradually decreases as the subframe increases.

The interpolation constant indicates the percentage of past data being reflected in the present data, and the value thereof can be set differently even within one frame because the first subframe in a frame is heavily influenced of a previous frame. The interpolation constant is a complementary value for obtaining an original waveform against the subframe, i.e., coder processing time unit of a frame to be transmitted.

Once the LSP parameter is obtained, parameter quantizing unit 406 quantizes the $LSP_x^{(0)}$ (i), and bit-packing unit 407 does the bit-packing with the LSP index value of G.723.1 and then outputs a G.723.1 voice packet.

The G.723.1 voice packet is transferred though a destination channel to the G.723.1 encoder of a receiving party. Unlike the conventional method, the chebyshev polynomial evaluation and searching cosine table do not have to be performed in order to obtain $LSP_{G\ 723.1}$. As a result, the amount of calculations which have to be performed is greatly reduced.

Referring to FIG. 8, the second trans-coder for voice packet conversion from G.723.1 to another encoder includes a bit-unpacking unit 411, a unquantizing unit 412, an LSP parameter converting unit 413, a parameter quantizing unit 416, and a bit-packing unit 417.

When a voice packet having been encoded at the G.723.1 encoder is input into the bit-unpacking unit 411 of the second trans-coder, bit-unpacking unit 331 performs the bit unpacking of the G.723.1 voice packet, and unquantizing unit 412 extracts (unpacks or unquantizes) $10^{th}$ order LSP parameters ($LSP_{G\ 723.1}^{(0)}$ (i)) from the unpacked G.723.1 data.

LSP parameter converting unit 413 converts the LSP parameters of G.723.1 to those of another encoder. The internal LSP interpolating unit 414 multiplies the LSP parameter ($LSP_{G\ 723.1}^{(-1)}$ (i)) of a previous frame in the unpacked G.723.1 encoder by an interpolation constant β, and multiplies ($LSP_{G\ 723.1}^{(0)}$ (i)) of a present frame by the value that is obtained by subtracting the interpolation constant β from the maximum interpolation constant, i.e., 1−β. Here, the interpolation constant (β) is in range of from 0 to 1, and the constant value is gradually decreased as the subframe within a frame is increased.

Divider 415 divides the interpolated LSP by 512, and obtains the LSP parameter ($LSP_{G\ 723}.^{(0)}$ (i)) of the present frame of another encoder. Dividing the LSP parameter by 512 can be implemented by right shift operation on 9-bit ($2^9$), and the shifting operation is actually a 1 cycle operation in a digital signal process (DSP). In other words, since G.723.1 has 512 of divided quantization tables, it is necessary to divide the LSP parameter by 512 to compensate as much as the difference of the expression format. For example, when the LSP parameter of another encoder is divided by 512, it is converted to the G.729 LSP parameter.

The relation described above can be expressed as Equation 2 below:

$$LSP_X^{(0)}(i)=(\beta\times LSP_{G\ 723.1}^{(-1)}(i)+(1-\beta)\times LSP_{G\ 723.1}^{(0)}(i)+512 \quad (2)$$

Here, $LSP_{723.1}^{(0)}(i)$ the LSP parameter of the present frame that is expressed in a LSP coefficient by unpacking an encoded packet by another encoder X, and $LSP_{G.723.1}^{(-1)}$ (i) is the LSP parameter of the previous frame that is expressed in a coefficient by unpacking an encoded packet by another encoder X. Also, in Equation 2, (i) is the $i^{th}$ coefficient, ranging from 0 to 9; (−1) is the previous frame; (0) is the present frame; and β is an interpolation constant. Preferably, the interpolation constant should satisfy the condition, $0\leqq\beta\leqq1$, and it gradually decreases as the subframe increases.

The interpolation constant indicates the percentage of past data being reflected in the present data, and the value thereof can e set differently even within one frame because the first subframe in a frame is heavily influenced of a previous frame. Additionally, the interpolation constant is a complementary value for obtaining an original waveform against the subframe, i.e., coder processing time unit of a frame to be transmitted.

Once the LSP parameter is obtained, parameter quantizing unit 416 quantizes the $LSP_{G\ 723\ 1}^{(0)}$ (i), and bit-packing unit 417 does the bit-packing with the LSP index value of G.723.1 and then outputs a voice packet (Packet-X) of another encoder. Later, the voice packet of another encoder is transferred through a channel to the codec of a receiving party. Unlike the conventional method, the chebyshev polynomial evaluation and searching cosine table do not have to be performed in order to obtain $LSP_x$. As a result, the amount of calculations which must be performed is greatly reduced.

The $LSP_X$ in Equations 1 and 2 is a value between 0 and 0.5, and $LSP_{G\ 723.1}$ is a value (π) between 0 and 256. Hence, the LSP parameter that is obtained in the trans-coder corresponds to the LSP that is obtained by using the conventional cosine table. Moreover, the bit packet having gone through the quantization process has precisely the same value.

FIG. 9 and FIG. 10 are flow charts representing a method for converting LSP parameter for voice packet conversion between another encoder and G.723.1 encoder in accordance with a preferred embodiment of the present invention.

FIG. 9 is a flow chart illustrating a method for converting LSP parameter for voice packet conversion from another encoder X to G.723.1 encoder. As depicted, once an encoded voice packet by another encoder X is input, the voice packet is bit-unpacked (S410) and LSP parameters ($LSP_x$) that are expressed by $10^{th}$ order coefficients are unpacked or unquantized by unquantizing the bit-unpacked data (S420). In short, the LSP parameter, $LSP_X^{(0)}$ (i) ($0\leqq i\leqq 9$) is extracted.

The LSP parameter of another encoder is converted to the LSP parameter of G.723.1 at a high speed (S440), and frames of another encoder's LSP parameters are interpolated (S441). The LSP parameter of G.723.1 ($LSP_{G\ 723\ 1}^{(0)}$ (i)) is obtained by multiplying the interpolated LSP parameter by 512 (S442). In other words, the $LSP_{G\ 723\ 1}^{(0)}$ (i) is obtained by interpolating $LSP_X^{(-1)}$ (i) of the previous frame and $LSP_x^{(0)}$ (i) of the present frame, respectively. Afterwards, the LSP parameter of the present frame of G.723.1 is quantized (S540), and goes through the bit-packing (S460), and finally, the voice packet of G.723.1 is output (S470).

FIG. 10 is a flow chart illustrating a method for converting LSP parameter of G.723.1 encoder to LSP parameter of another encoder X for voice packet conversion. As depicted, once an encoded voice packet by G.723.1 is input, the voice packet goes through the bit-unpacking (S520) and unquantization. In such manner, the LSP parameter, $LSP_{G.723.1}^{(0)}$ (i), of a relevant signal is expressed in $10^{th}$ order coefficients (S530).

Similar to Equation 2, the LSP parameter of the previous frame and the LSP parameter of the present frame are interpolated, respectively (S541), and after adding the interpolated frame, they are divided by 512 (S542), thereby converting the parameter to another encoder's LSP parameter, $LSP_X^{(0)}$ (i) (S540).

Once the LSP parameter for the present frame of another encoder is obtained, it is quantized by using the LSP parameter (S550), and the quantized data is bit-packed together with other parameters to make a voice packet of G.723.1 (S560), and the thusly made voice packet of G.723.1 is output (S570).

In summary, the chebyshev polynomial evaluation and searching the cosine table are no longer needed because of trans-coding of $LSP_{G\cdot 7231}$. Instead, by multiplying or dividing the LSP parameter by 512, the calculation amount is greatly reduced. [$LSP_{G\ 723\ 1}(0)$, $LSP_{G\ 723\ 1}$ (1), . . . , $LSP_{G\ 723.1}$ (9)] can be obtained by multiplying [$LSP_x(0)$, $LSP_x(1)$, . . . , $LSP_x(9)$] by 512. On the other hand, [$LSP_x(0)$, $LSP_x(1)$, . . . , $LSP_x(9)$] can be obtained by dividing [$LSP_{G.723.1}$ (0), $LSP_{G.723\ 1}$ (1), . . . , $LSP_{G\ 723.1}$ (9)] by 512.

Moreover, in fixed-point operation, multiplication/division by 512 can be implemented by 9-bit left/right shift. In fact, the LSP conversion parameter has compatible results with the LSP parameter that is obtained by using the cosine table in the related art, and the bit packet having gone through the quantization process has exactly the same result with that of the related art.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for converting voice packets transmitted/received through a network comprising:

a first transcoder which performs at least one of bit-unpacking or unquantization on a first encoded packet to obtain a first line spectral pair (LSP) parameter of a first encoder, and which converts the first LSP parameter to a second parameter of a second encoder; and a second transcoder which performs at least one of bit-unpacking or unquantization on a second encoded packet to obtain a third LSP parameter of the second encoder, and which converts and unquantizes the third LSP parameter to a fourth LSP parameter of the first encoder, wherein the first transcoder includes a first LSP parameter converting circuit which comprises:

an LSP interpolating circuit to perform interpolation between frames on the first LSP parameter, said LSP interpolating circuit multiplying the first LSP parameter of a previous frame by an interpolation constant and multiplying the first LSP parameter of a present frame by a value obtained by subtracting the interpolation constant from a maximum interpolation constant; and a multiplier to multiply the interpolated LSP parameter by a constant to compensate for a scale difference of LSP and to output the second LSP parameter based on a result of said multiplication.

2. The apparatus, according to claim 1, wherein the first transcoder comprises:

a bit-unpacking circuit for bit-unpacking the first encoded packet;

an unquantizing circuit for unquantizing data in the bit-unpacked packet to obtain the first LSP parameter;

a parameter quantizing unit for quantizing the second LSP parameter output from the LSP interpolating circuit; and bit-packing circuit for bit-packing the quantized parameter and outputting the bit-packed parameter in a packet of the second encoder.

3. The apparatus according to claim 1, wherein the second transcoder comprises:

a bit-unpacking circuit for bit-unpacking the second encoded packet;

an unquantizing circuit for unquantizing data in the bit-unpacked packet to obtain the third LSP parameter;

a second LSP parameter converting circuit for converting a voice parameter of the second encoder to the fourth LSP parameter;

a parameter quantizing circuit for quantizing the converted parameter; and a bit-packing circuit for bit-packing the quantized parameter and outputting the bit-packed parameter in a packet of the second encoder.

4. The apparatus according to claim 3, wherein the second LSP parameter converting circuit in the second transcoder further comprises:

an LSP interpolating circuit for performing LSP interpolation between frames of the second encoder; and a divider for dividing the interpolated LSP parameter by a constant to compensate scale for a difference of LSP, and outputting through multiplication as the fourth LSP parameter.

5. The apparatus according to claim 1, wherein the interpolation constant is in a range of from 0 to 1 in order to smooth a frame, and wherein different interpolation constant values are applied to different kinds of encoding parameters.

6. The apparatus according to claim 1, wherein the multiplier multiplies a frame LSP parameter of the first encoder by said constant to compensate for a scale difference of LSP during a course of converting the first LSP parameter of the first encoder to the second LSP parameter of the second encoder, and implements the multiplication through bit-shifting.

7. The apparatus according to claim 4, wherein the divider divides a frame LSP parameter of the second encoder by an appropriate constant to compensate for a scale difference of LSP during the course of converting the frame LSP parameter of the second encoder to the frame LSP parameter of the first encoder, and implements the multiplication through bit-shifting.

8. The apparatus according to claim 1, wherein the second encoder is a G.723.1 voice encoder for a data network.

9. The apparatus according to claim 1, wherein the constant for compensating for the LSP scale difference between the second encoder and another encoder is set at 512.

10. A method for converting voice packets transmitted/received through a network, comprising:

(a) performing at least one of an unpacking process per information unit or an unquantization process on a first encoded packet by a first encoder;

(b) obtaining a first line spectral pair (LSP) parameter of the first encoder;

(c) outputting a packet of a second encoder by converting the first LSP parameter to a second LSP parameter of the second encoder, and performing at least one of a quantizing process or packing process per information unit;

(d) performing at least one of the unpacking process per information unit or the unquantization process on a second encoded packet by a second encoder;

(e) obtaining a third LSP parameter of the second encoder; and (f) outputting a packet of the first encoder by converting the third LSP parameter to a fourth LSP parameter of the first encoder, and performing at least one of the quantizing process or the packing process per information unit, wherein (c) comprises:

interpolating the first LSP parameter of the first encoder for a previous frame and the first LSP parameter of the first encoder for a present frame; and obtaining the second LSP parameter of the second encoder for the present frame by shifting the interpolated LSP parameter by a predetermined number of bits.

11. The method according to claim 10, wherein the LSP parameter of the present frame is obtained based on an Equation below:

$$LSP_Y^{(0)}(i)=(\alpha\times LSP_X^{(-1)}(i)+(1-\alpha)\times LSP_X^{(0)}(i))\times C$$

wherein $LSP_X^{(0)}(i)$ and $LSP_X^{(-1)}(i)$ are, respectively, the first LSP parameter of the first encoder for the present frame and the first LSP parameter of the first encoder for the previous frame, $LSP_Y^{(0)}$ is the second LSP parameter of the second encoder for the present frame, and C is a constant.

12. The method according to claim 11, wherein (i) corresponds to $i^{th}$ order coefficients in a range of from 0 to 9.

13. The method according to claim 10, wherein $\alpha$ is an interpolation constant in a range of $0\leqq\alpha\leqq1$.

14. The method according to claim 13, wherein the interpolation constant gradually decreases as a subframe within a frame increases.

15. The method according to claim 10, wherein step (f) comprises:

interpolating the third LSP parameter of the second encoder for a previous frame and the third LSP parameter of the second encoder for a present frame; and obtaining the fourth LSP parameter of the first encoder for the present frame by dividing the interpolated LSP by a predetermined number.

16. The method according to claim 11, wherein the fourth LSP parameter of the present frame is obtained based on an Equation below:

$$LSP_N^{(0)}(i)=(\beta\times LSP_M^{(-1)}(i)+(1-\beta)\times LSP_M^{(0)}(i))\div K$$

wherein $LSP_M^{(0)}(i)$ and $LSP_M^{(-1)}(i)$ are, respectively, the third LSP parameter of the second encoder for the present frame and the third LSP parameter of the second encoder for the previous frame, $LSP_N^{(0)}$ is the fourth LSP parameter of the first encoder for the present frame, and K is the predetermined number.

17. The method according to claim 16, wherein β is an interpolation constant in a range of $0 \leqq \beta \leqq 1$.

18. The method according to claim 10, wherein the predetermined number of bits is 9.

19. The method according to claim 18 wherein C is 512.

20. The method according to claim 15 wherein the predetermined number is 512.

21. An apparatus for converting voice packets transmitted/received through a network, comprising:

a transcoder which performs at least one of bit-unpacking or unquantization on a first encoded packet to obtain a first line spectral pair (LSP) parameter of a first encoder, and which converts the first LSP parameter to a second parameter of a second encoder, said transcoder including:

an interpolating circuit to interpolate between the first LSP parameter of the first encoder for a previous frame and the first LSP parameter of the first encoder for a present frame, a shifter to shift the interpolated LSP parameter by a predetermined number of bits, wherein the second LSP parameter is based on the shifted and interpolated LSP parameter.

22. The apparatus according to claim 21, wherein the interpolating circuit generates the interpolated LSP parameter by:

multiplying the first LSP parameter of the previous frame by an interpolation constant, and multiplying the first LSP parameter of a present frame by a value obtained by subtracting the interpolation constant from a maximum interpolation constant, wherein the interpolation constant provides an indication of a percentage of past data reflected in present data.

23. The apparatus according to claim 22, wherein the previous frame includes at least a portion of said past data and the present frame includes at least a portion of said present data.

24. An apparatus for converting voice packets transmitted/received through a network, comprising:

a transcoder which performs at least one of bit-unpacking or unquantization on a first encoded packet to obtain a first line spectral pair (LSP) parameter of a first encoder, and which converts the first LSP parameter to a second parameter of a second encoder, said transcoder including:

an interpolating circuit to interpolate between the first LSP parameter of the first encoder for a previous frame and the first LSP parameter of the first encoder for a present frame, the interpolated LSP parameter generated based on an interpolation constant which provides an indication of a percentage of past data reflected in present data, and a multiplier to multiply the interpolated LSP parameter by another constant to compensate for a scale difference between frames of the first and second encoders, the second LSP parameter generated based on the based on a result of said multiplication.

25. The apparatus according to claim 24, wherein the interpolating circuit generates the interpolated LSP parameter by:

multiplying the first LSP parameter of the previous frame by the interpolation constant, and multiplying the first LSP parameter of a present frame by a value obtained by subtracting the interpolation constant from a maximum interpolation constant, wherein the interpolation constant provides an indication of a percentage of past data reflected in present data.

26. The apparatus according to claim 25, wherein the previous frame includes at least a portion of said past data and the present frame includes at least a portion of said present data.

* * * * *